Patented Nov. 9, 1926.

1,605,925

UNITED STATES PATENT OFFICE.

VIGGO DREWSEN, OF LARCHMONT, NEW YORK.

PROCESS OF TREATING WASTE-SODIUM MONOSULPHITE LIQUORS.

No Drawing.  Application filed April 3, 1922. Serial No. 549,195.

This invention relates particularly to processes of treating the waste sodium monosulphite ($Na_2SO_3$) cooking liquors which are produced in the digestion of straw, corn stalks, wood, and other fibrous material; for the production of paper pulp etc. so as to recover the valuable inorganic constituents of such liquors and prepare the cooking liquors for reuse in fibre digestion. The waste sodium monosulphite liquor from the digester is preferably concentrated as in vacuum evaporators until it contains only about fifty percent of water. Then twenty-five to one hundred percent by weight of powdered caustic lime may be added and stirred into the hot concentrated liquor which vigorously reacts therewith and forms a more or less solid or dry calcium acetate organic material. This material may advantageously be dry distilled at progerssively higher temperatures in a rotary retort while agitated in the presence of super-heated steam so that considerable amounts of acetone, methyl alcohol and other heavier oily materials may be recovered while the carbonized material from the distillation retort may be calcined in the presence of air to burn out more of the organic material. This calcined material, containing calcium sulphide and soluble sodium carbonate, may be leached to recover the carbonate while the remaining calcium sulphide, which may be ground at any desired stage of the process, may be suspended in water and treated with carbon dioxide as by percolation with kiln gases or stronger carbon dioxide which will form calcium carbonate and liberate hydrogen sulphide which may be burned to form sulphur dioxide for combination with the sodium carbonate to form the desired sodium monosulphite for the fibrous cooking liquor. The remaining calcium carbonate may be burned as in a rotary lime kiln to form quick lime for use in this process.

The concentrated waste liquor resulting from the sodium monosulphite process or cooking straw, cornstalks, wood, etc., may be treated with twenty-five to fifty percent, more or less, of caustic lime which may be added in dry powdered condition to the hot waste liquor from the vacuum evaporators which may contain about fifty percent of water. A vigorous reaction takes place, which drives off considerable steam and produces a solid calcium acetate organic material which contains relatively less water in proportion to the larger amounts of quick lime originally combined with the waste liquor. This organic material may be subjected to a dry distillation process at progressively higher temperatures while the material is agitated in a rotary retort into which superheated steam is preferably injected, and considerable amounts of acetone and methyl alcohol can be recovered and condensed from the distillation vapors in addition to the heavier oily materials. For example, the waste sodium monosulphite liquor from wheat-straw, when treated by the sodium monosulphite process, gave under this treatment about 1.7% of acetone and about 1% methyl alcohol as compared to the dry weight of the original dry straw, from which about 1100 lbs. of unbleached pulp was secured by this method.

The resulting carbonized material from the dry distillation retort is preferably burned, in a rotary incinerator for example, in the presence of air, which burns out still more of the organic material and completes the combination of the inorganic components into calcium sulphide, and also into sodium carbonate which may then be leached out and recovered for reuse or sale. The remaining calcium sulphide may be suspended in water and treated as by percolation with kiln gases or flue gases which produce calcium carbonate and hydrogen sulphide which may be reburned to sulphur dioxide and used to form sodium monosulphite in any desired way. The calcium carbonate may be burned to quick lime for use in this process or otherwise.

Of course it is not necessary to dry distill the calcium acetate organic material formed by the action of the quick lime on the concentrated waste liquor, which may be in some cases directly incinerated in the presence of air to form the combined organic material from which the sodium carbonate may be leached out as above indicated.

This invention has been described in connection with a number of illustrative materials, proportions, conditions, arrangements and orders of steps, to the details of which disclosure the invention is not of course to be limited, since what is claimed as new and what is desired to be secured by Letters Patent is set forth in the appended claims.
I claim:

1. The process of treating the waste sodium monosulphite treating liquor produced in the digestion of vegetable fibrous material, which comprises concentrating the treating liquor in vacuum evaporators, combining with the hot concentrated liquor 25 to 75% of powdered caustic lime to form a substantially solid calcium acetate organic material, dry distilling such organic material in the presence of superheated steam to recover acetone, methyl alcohol and other volatile solvents and incinerating the retort residue to form calcium sulphide and sodium carbonate therein, leaching sodium carbonate out of said retort residue and treating the leached residue with carbon dioxide kiln gases to form calcium carbonate and liberate hydrogen sulphide, buring the hydrogen sulphide to sulphur dioxide and combining the same with the sodium carbonate to form sodium monosulphite for the cooking liquor and burning the calcium carbonate residue to form quick lime for use in the process.

2. The process of treating the waste sodium monosulphite treating liquor produced in the digestion of vegetable fibrous material, which comprises concentrating the treating liquor until it contains only about 50% of water, combining with the hot concentrated liquor powdered caustic lime to form a substantially solid calcium acetate organic material, dry distilling such organic material to recover acetone, methyl alcohol and other volatile solvents and incinerating the retort residue to form calcium sulphide and sodium carbonate therein, leaching sodium carbonate out of said retort residue and treating the leached residue with carbon dioxide kiln gases to form calcium carbonate and liberate hydrogen sulphide, burning the hydrogen sulphide to sulphur dioxide and combining the same with the sodium carbonate to form sodium monosulphite for the cooking liquor.

3. The process of treating the waste sodium monosulphite treating liquor produced in the digestion of vegetable fibrous material, which comprises concentrating the treating liquor, combining with the concentrated liquor at least 25% powdered caustic lime to form calcium acetate organic material, dry distilling such organic material to recover acetone, methyl alcohol or other volatile solvents and incinerating the retort residue to form calcium sulphide and sodium carbonate therein, leaching sodium carbonate out of said retort residue and treating the leached residue with carbon dioxide to form calcium carbonate and liberate hydrogen sulphide, burning the hydrogen sulphide to sulphur dioxide and combining the same with the sodium carbonate to form sodium monosulphite for the cooking liquor.

4. The process of treating the waste sodium monosulphite treating liquor produced in the digestion of vegetable fibrous material, which comprises concentrating the treating liquor, combining with the concentrated liquor at least 25% of powdered caustic lime to form calcium acetate organic material, incinerating such organic material to form sodium carbonate therein, leaching sodium carbonate out of said retort residue and treating the sodium carbonate to form sodium monosulphite for the cooking liquor.

5. The process of treating the waste sodium monosulphite treating liquor produced in the digestion of vegetable fibrous material, which comprises concentrating the treating liquor, combining with the concentrated liquor enough of caustic lime to form substantially solid calcium acetate organic material, dry distilling such organic material to recover acetone, methyl alcohol or other volatile solvents and incinerating the retort residue to form calcium sulphide and sodium carbonate therein, leaching sodium carbonate out of said retort residue and treating the leached residue to form sulphur dioxide.

6. The process of treating the waste sodium monosulphite treating liquor produced in the digestion of vegetable fibrous material, which comprises concentrating the treating liquor, combining with the concentrated liquor caustic lime to form calcium acetate organic material, incinerating such organic material to form sodium carbonate, leaching out said sodium carbonate.

VIGGO DREWSEN.